March 4, 1924.
E. J. HAYNES
SOUNDING LINE
Filed Aug. 11, 1922
1,485,394
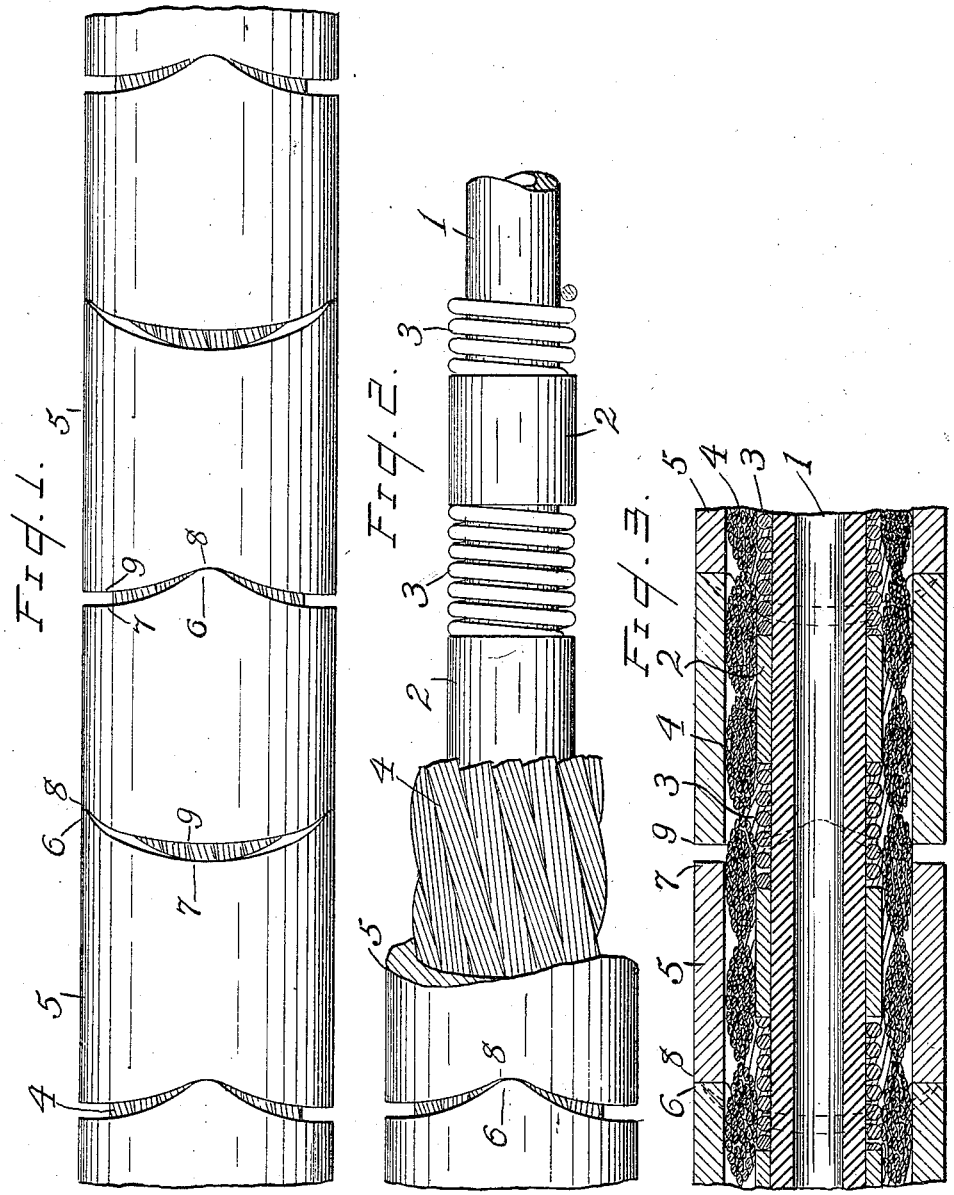
Inventor
Elbert J. Haynes.
By
Attorney Patented Mar. 4, 1924.

1,485,394

UNITED STATES PATENT OFFICE.

ELBERT J. HAYNES, OF CLEVELAND, OHIO.

SOUNDING LINE.

Application filed August 11, 1922. Serial No. 581,110.

*To all whom it may concern:*

Be it known that I, ELBERT J. HAYNES, a citizen of the United States, residing at Cleveland, in the county of Cuyahoga and State of Ohio, have invented a new and useful Sounding Line, of which the following is a specification.

This invention relates to sounding lines and more particularly to sounding lines comprising a flexible air tube and a flexible metallic armor for said tube.

It is the object of the invention to provide a flexible pneumatic sounding line having an armor adapted to powerfully resist external pressure, as well as longitudinal stresses, and yet possessing a considerable degree of flexibility in all directions.

In attaining this object the invention contemplates embracing an air hose, formed of rubber or like material, of an inner armor formed of metal collars alternating with coils of spring wire, a wire rope cable being wound upon this inner armor at an acute angle to the axis of the line, and said cable being embraced by an outer armor comprising metallic sleeves having their ends pivotally abutting in such an engagement as to prevent appreciable relative rotation about the axis of the line, but permitting a considerable flexing of the line in any direction.

A preferred embodiment of the invention is hereinafter described, and is illustrated in the accompanying drawing, wherein, Fig. 1 is a view in side elevation of a portion of the improved line.

Fig. 2 is a similar view with the armoring elements successively broken away to disclose the interior construction.

Fig. 3 is an axial sectional view of the line.

In these views the reference character 1 designates an air hose formed of rubber or other material having the necessary characteristics of flexibility and imperviousness to air. Said hose is embraced by an inner armor comprised of metallic collars 2, alternating with coils 3 of spring wire, preferably of gradual pitch. Upon this inner armor there is helically wound a cable 4 formed of wire rope, the strands of which are acutely pitched so as to the more effectively resist stresses acting longitudinally of the sounding line. Finally there is applied an outer armor formed by metallic sleeves 5, having their ends so engaged as to form fulcrums for a limited pivotal movement in transverse directions at alternating joints. This effect is secured by gradually curving one end face of said sleeves so as to form diametrically opposed obtusely pointed tongues 6 and intervening arcs 7 receding toward the other end face of the sleeve, the latter being also gradually curved to form diametrically opposed obtuse angular recesses 8, serving as seats for the tongues upon the end face of an adjoining sleeve and intermediate arcuate projections 9, the longitudinal extent of said projections being less than that of the arcs 7, so as to provide for a limited flexing about the fulcrums formed by said tongues. The tongues 6 at one end of each sleeve are a quarter turn circumferentially removed from the recesses 8 at the other end thereof, so that the joints alternately provide for flexing in transverse directions. The collars 2 are respectively arranged interiorly of the sleeves 5, while the flexible coils 3 register centrally with the joints between said sleeves. Thus the inner armor 2, 3, does not interfere with the flexibility of the outer armor 5.

The described sounding line strongly protects the air hose against hydrostatic pressure (which in taking deep water soundings exerts a powerful force) and also safeguards the hose from cutting and abrasion. The cable 4, while primarily functioning to take care of the severe longitudinal stresses arising when a considerable length of the cable is extended, also opposes considerable resistance to hydrostatic pressure, since the strands of said cable are subjected in winding to a high torsional stress.

The universal flexibility of the line (and particularly of the outer armor) is desirable to permit the line to be freely wound upon a suitable drum, when not extended.

What I claim is:

1. A sounding line comprising an air hose, an inner armor embracing said hose, comprised of alternate collars and flexible metal coils, and a surrounding armor extending substantially continuously co-extensive with the air hose.

2. A sounding line comprising an air hose, an inner armor embracing said hose, comprised of alternating rigid collars and flexible metal coils, a surrounding flexible continuous armor substantially co-extensive with the air hose, and a sectional flexible metallic outer armor.

3. A sounding line comprising an air hose, an inner armor embracing said hose, comprised of alternating rigid collars and flexible metal coils, a surrounding flexible continuous armor substantially co-extensive with the air hose, and an outer flexible armor comprising metal sleeves, the rigid sections of the inner armor being located within said sleeves and the flexible coils registering with the joints between the sleeves, whereby the rigidity of the sections of the inner armor is no obstacle to flexing of the outer armor.

In testimony whereof I sign this specification.

ELBERT J. HAYNES.